US011432659B2

(12) United States Patent
Fox (10) Patent No.: US 11,432,659 B2
(45) Date of Patent: Sep. 6, 2022

(54) BED-MOUNTED STORAGE DEVICE (71) Applicant: Alan J. Fox, Dimondale, MI (US)

(72) Inventor: Alan J. Fox, Dimondale, MI (US)

( * ) Notice: Subject to any disclaimer, the term of this patent is extended or adjusted under 35 U.S.C. 154(b) by 307 days.

(21) Appl. No.: 15/931,625

(22) Filed: May 14, 2020

(65) Prior Publication Data
US 2020/0367661 A1 Nov. 26, 2020

Related U.S. Application Data (60) Provisional application No. 62/851,822, filed on May 23, 2019.

(51) Int. Cl.
*A47C 21/00* (2006.01)
*F16M 13/02* (2006.01)
(52) U.S. Cl.
CPC .......... *A47C 21/00* (2013.01); *F16M 13/022* (2013.01)
(58) Field of Classification Search
None
See application file for complete search history.

(56) References Cited

U.S. PATENT DOCUMENTS

| | | | |
|---|---|---|---|
| 2,976,546 A | 3/1961 | Owens | |
| 3,241,159 A | 3/1966 | Reed | |
| 5,426,800 A * | 6/1995 | St. John | A47C 21/028 5/507.1 |
| 5,509,158 A | 4/1996 | Morrison | |
| 5,581,829 A | 12/1996 | Lee | |
| 5,652,979 A | 8/1997 | Pugh et al. | |
| 5,758,972 A | 6/1998 | Mack et al. | |
| 6,769,143 B2 | 8/2004 | Clarke | |
| 7,096,527 B2 * | 8/2006 | Malik | A47C 21/028 5/504.1 |
| 8,578,528 B1 | 11/2013 | Heare | |
| 8,800,079 B1 | 8/2014 | Eubank | |
| 8,918,931 B1 * | 12/2014 | Baker | A47C 21/022 5/659 |
| 10,765,223 B2 * | 9/2020 | Marino | A47C 21/00 |
| 10,813,482 B2 * | 10/2020 | Oliver | A47G 9/1036 |
| 2004/0261175 A1 * | 12/2004 | May | A47C 7/62 5/503.1 |
| 2014/0189952 A1 * | 7/2014 | Crispino | A47G 9/02 112/475.08 |
| 2017/0049242 A1 * | 2/2017 | Franken | A47C 31/123 |
| 2019/0000237 A1 * | 1/2019 | Baranoff | A47C 17/86 |
| 2020/0323355 A1 * | 10/2020 | Jacot | B32B 27/12 |

* cited by examiner

*Primary Examiner* — Xanthia C Cunningham
(74) *Attorney, Agent, or Firm* — Price Heneveld LLP (57) ABSTRACT

A storage device for installation on a bed includes a horizontal support member configured to be inserted between two mattress members. A vertical support member is coupled with and supported by the horizontal support member. A plurality of securing members are coupled to the vertical support member. A flexible storage member is fixedly secured to the plurality of securing members at a first edge and selectively attached to the plurality of securing members at a second edge. The flexible storage member is operable between a stowed position and a use position. The stowed position is defined by the flexible storage member being at least partially concealed from view. The use position is defined by the flexible storage member forming an interior storage space that is contained within the flexible storage member and supported by the plurality of securing members.

20 Claims, 10 Drawing Sheets

BED-MOUNTED STORAGE DEVICE

CROSS-REFERENCE TO RELATED APPLICATION

This application claims priority to and the benefit under 35 U.S.C. § 119(e) of U.S. Provisional Patent Application No. 62/851,822, filed on May 23, 2019, entitled BED-MOUNTED STORAGE DEVICE, the entire disclosure of which is hereby incorporated herein by reference.

FIELD OF THE INVENTION

The present invention generally relates to storage devices, and more specifically, a storage device that can be used with a bed.

BACKGROUND OF THE INVENTION

Beds within residential and hospitality settings, such as hotels, motels, resorts and other temporary accommodations, include various linens and bed coverings. These linens may include fitted sheets, top sheets and pillow cases and the bed coverings may include comforters, bed spreads, duvets, duvet covers, shams, other pillows, and other similar decorative linens. These linens and bed coverings may take up a significant amount of space when not in use. Additionally, it may not be desirable to place the linens and bed coverings on the floor or other surface when changing linens or other times when not in use. This is particularly true of temporary accommodations and other hospitality-type settings.

SUMMARY OF THE INVENTION

According to one aspect of the present invention, a storage device for installation on a bed includes a horizontal support member configured to be inserted between two mattress members. A vertical support member is coupled with and supported by the horizontal support member. A plurality of securing members are coupled to the vertical support member. A flexible storage member is fixedly secured to the plurality of securing members at a first edge and selectively attached to the plurality of securing members at a second edge. The flexible storage member is operable between a stowed position and a use position. The stowed position is defined by the flexible storage member being at least partially concealed from view. The use position is defined by the flexible storage member forming an interior storage space that is contained within the flexible storage member and supported by the plurality of securing members.

According to another aspect of the present invention, a storage device for installation on a bed includes a horizontal support member that is supported between a mattress and a mattress support. A vertical stanchion is attached to the horizontal support member and is laterally supported against the mattress support. A securing member is coupled to the vertical stanchion. A flexible storage member is fixedly secured to the securing member at a first edge of the flexible storage member and selectively attached to a plurality of securing members at a second edge of the flexible storage member. The flexible storage member is operable between a stowed position that is collapsed against the flexible storage member and a use position defined by the flexible storage member forming an interior storage space that is contained within the flexible storage member and supported by the plurality of securing members.

Another to another aspect of the present invention, a storage device for installation on a bed includes a horizontal support member that is supported between two mattress members. A vertical support member is coupled with and supported by the horizontal support member. A plurality of securing members are coupled to the vertical support member. A flexible storage member is fixedly secured to the plurality of securing members at a first edge and selectively attached to the plurality of securing members at a second edge. The flexible storage member is operable between a stowed position and a use position. The stowed position is defined by the flexible storage member being at least partially concealed from view. The use position is defined by the flexible storage member forming an interior storage space that is contained within the flexible storage member and supported by the plurality of securing members. The flexible storage member defines an access space into the interior storage space when a portion of the second edge is separated from the plurality of securing members.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
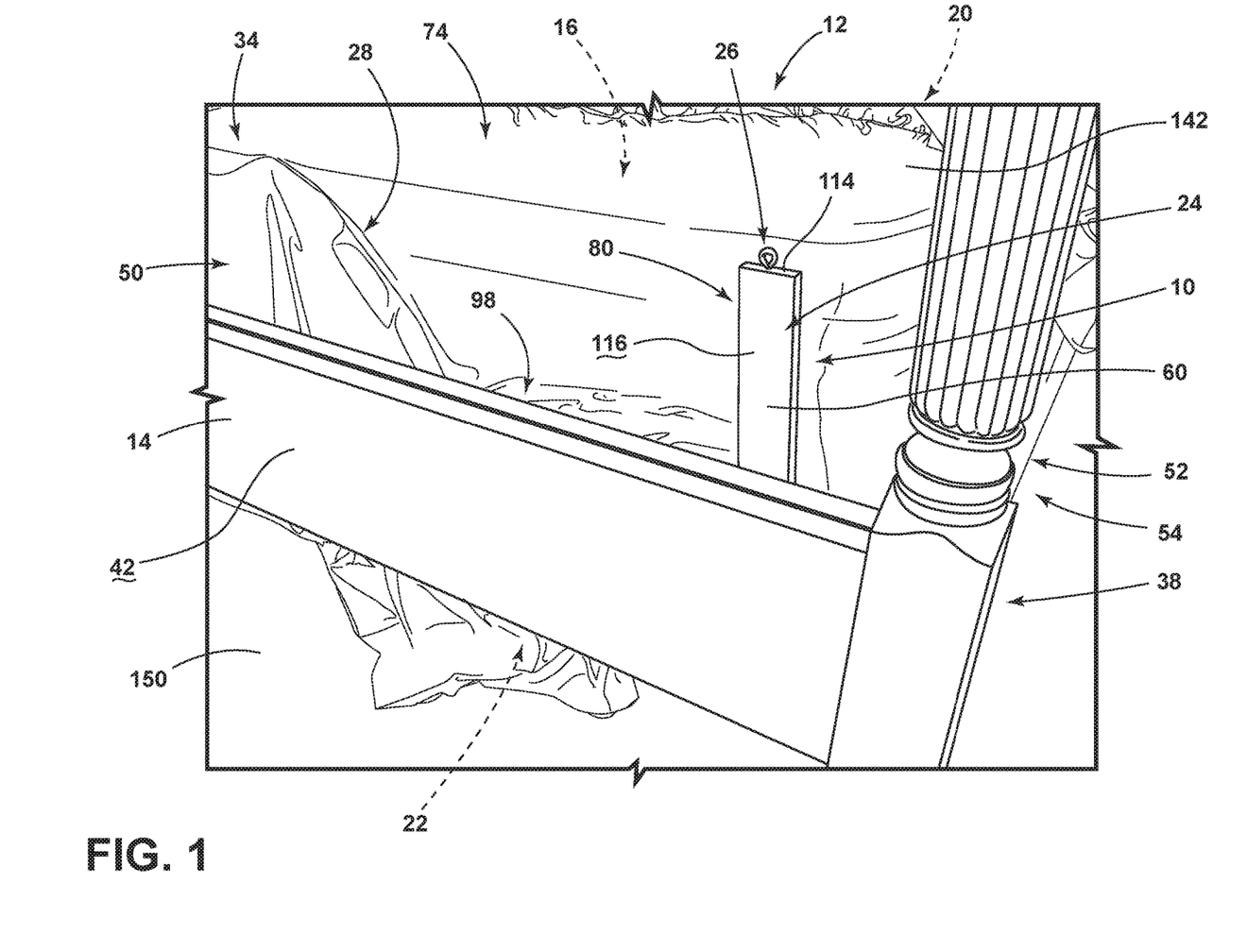
FIG. 1 is a perspective view of a bed that includes an aspect of the storage device coupled to the bed.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-14, reference numeral 10 generally refers to a storage device that can be installed within a bed 12 and that can be used for storing various linens, bed coverings and other bed accessories 44 when not in use. According to the various aspects of the device, the storage device 10 can be adapted for installation on a bed 12 that may have a footboard 14 that at least partially conceals a mattress 16. It is typical that the storage device will be utilized in the absence of a footboard 14. The storage device 10 can include a horizontal support member 18 that is configured to be inserted between two mattress members 20. Typically, the mattress members 20 will include the mattress 16 and a mattress support 22 that is positioned below the mattress 16. The mattress support 22 is typically in the form of a box spring, but may also include a foundation platform, supporting slats, a frame member 38, a secondary mattress, combinations thereof and other supporting devices.

Referring again to FIGS. 1-14, the storage device 10 also includes a vertical support member 24 that is coupled with, and is supported by, the horizontal support member 18. A plurality of securing members 26 are coupled to the vertical support member 24. A flexible storage member 28 is fixedly secured to the plurality of securing fasteners 110 at a first edge 30 of the flexible storage member 28. The flexible storage member 28 is also selectively attached to, and selectively removable from, the plurality of securing members 26 at a second edge 32 of the flexible storage member 28. The flexible storage member 28 is operable between a stowed position 34 and a use position 36. In this manner, the second edge 32 of the flexible storage member 28 can include operable fasteners 112 that can be readily attached to and removed from the securing members 26 of the vertical support member 24.

As exemplified in FIGS. 3, 4, 7 and 8, the stowed position 34 is typically defined by the flexible storage member 28 being collapsed and typically draped against the vertical support member 24 and one or both of the mattress members 20. Typically, in the stowed position 34, the flexible storage member 28 is concealed from view, such as beneath a bed covering member 142 or behind the vertical support member 24. Where a footboard 14 is present, the stowed position 34 can be defined by the flexible storage member 28 being tucked behind a frame member 38 of the bed 12. This frame member 38 is typically in the form of the footboard 14 that at least partially conceals the mattress 16 and, in most cases, fully conceals the mattress support 22 from view. Accordingly, the flexible storage member 28 in the stowed position 34 can be concealed from view.

According to the various aspects of the device, the storage device 10 can be positioned at the foot 50 of the bed 12. The storage device 10 can also be positioned at a side 52 of the bed 12 and other locations around the perimeter of the bed 12 between the mattress members 20. The storage device 10 can also be positioned to wrap around a corner 54 of the bed 12.

Referring to FIGS. 5, 6, 9 and 10, the use position 36 of the flexible storage member 28 is defined by the flexible storage member 28 forming an interior storage space 40 that is contained within the flexible storage member 28. In the use position 36, the flexible storage member 28 expands to form the interior storage space 40 that may extend from the mattress members 20. Where a footboard 14 is present, the flexible storage member 28 in the use position 36 may extend outside of the footboard 14 and typically rests against a front surface 42 of the footboard 14. In this manner, the flexible storage member 28 and the bed accessories 44 contained within the interior storage space 40 are supported by the plurality of securing members 26.

As exemplified in FIGS. 1-13, the vertical support member 24 typically includes a plurality of vertical stanchions 60 that are coupled with the horizontal support member 18. Each vertical stanchion 60 of the storage device 10 includes a respective securing member 26 of the plurality of securing members 26. In various aspects of the device, the storage device 10 can include a single horizontal support member 18 that is inserted between the two mattress members 20. The plurality of vertical support members 24, in the form of the vertical stanchions 60, can extend from the horizontal support member 18 for providing the plurality of securing members 26 for supporting the flexible storage member 28.

As exemplified in FIGS. 1-13, the horizontal support member 18 can include a plurality of horizontal bases 70. In such a configuration, each horizontal base 70 is coupled to a respective vertical stanchion 60. As discussed above, each vertical stanchion 60 includes a respective securing member 26. Where the storage device 10 includes a plurality of support fixtures 72, each support fixture 72 includes a vertical stanchion 60, a horizontal base 70 and a respective securing member 26. In using the support fixtures 72, the various support fixtures 72 can be spaced along a foot-side edge 74 of the mattress members 20. The horizontal base 70 is positioned between the mattress members 20 and the vertical stanchion 60 is positioned against the foot-side edge 74 of the mattress members 20. When a footboard 14 is present, the vertical stanchion 60 may be positioned between the mattress members 20 and the footboard 14. These support fixtures 72 can be spaced apart from one another to accommodate different sized beds 12, such as king, queen, double, twin, daybed, child-sized beds, bunk beds, and other mattress sizes and bed types.

Figure 2:
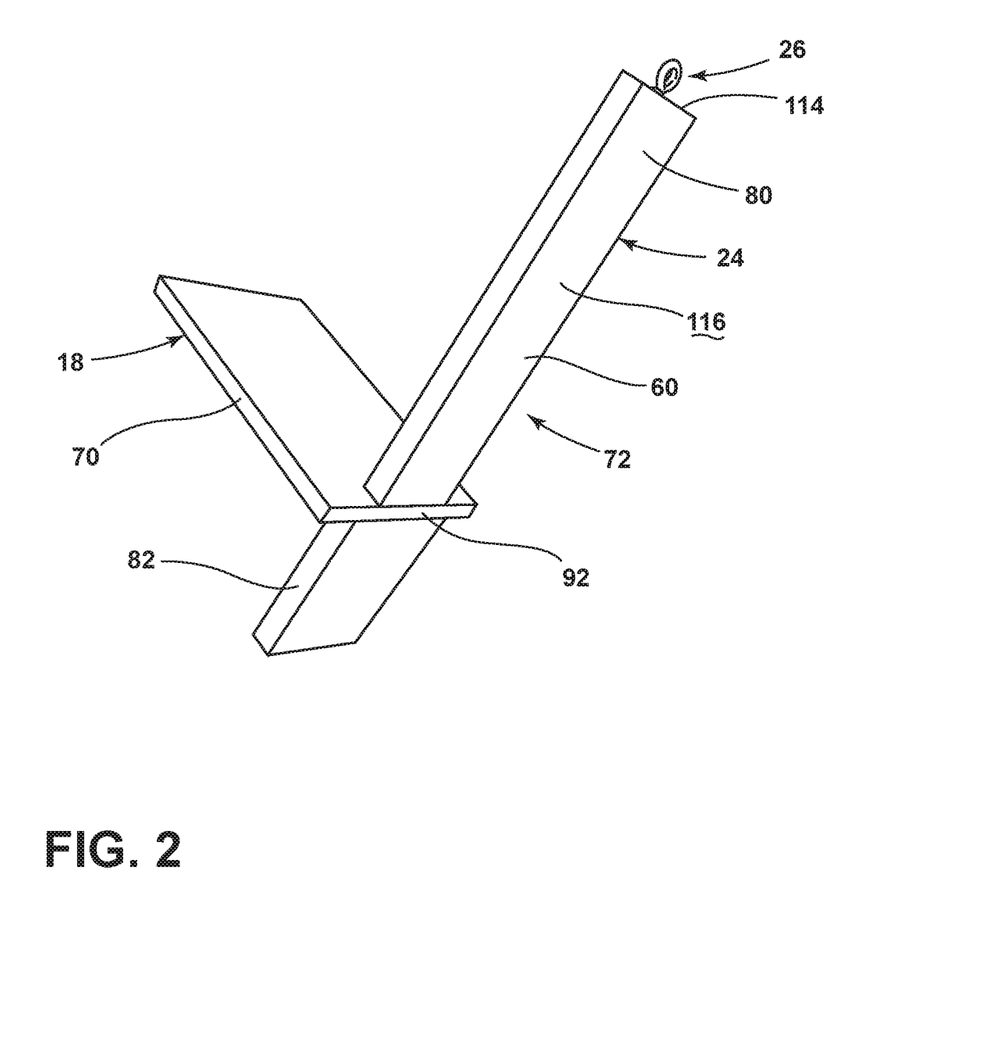
FIG. 2 is a perspective view of a portion of the storage device.
Figure 3:
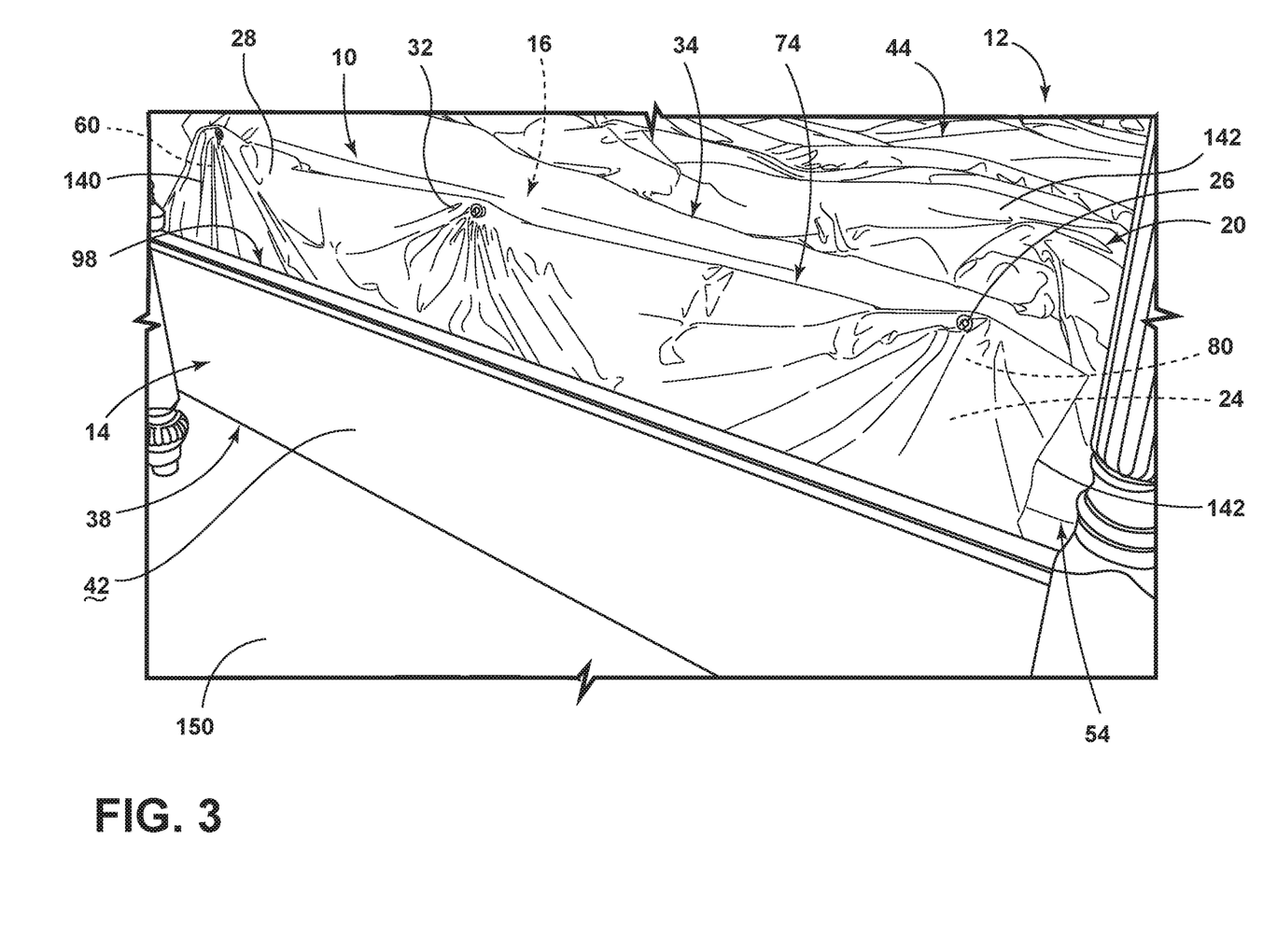
FIG. 3 is a perspective view of the storage device installed on a bed and shown in the stowed position.
Figure 4:
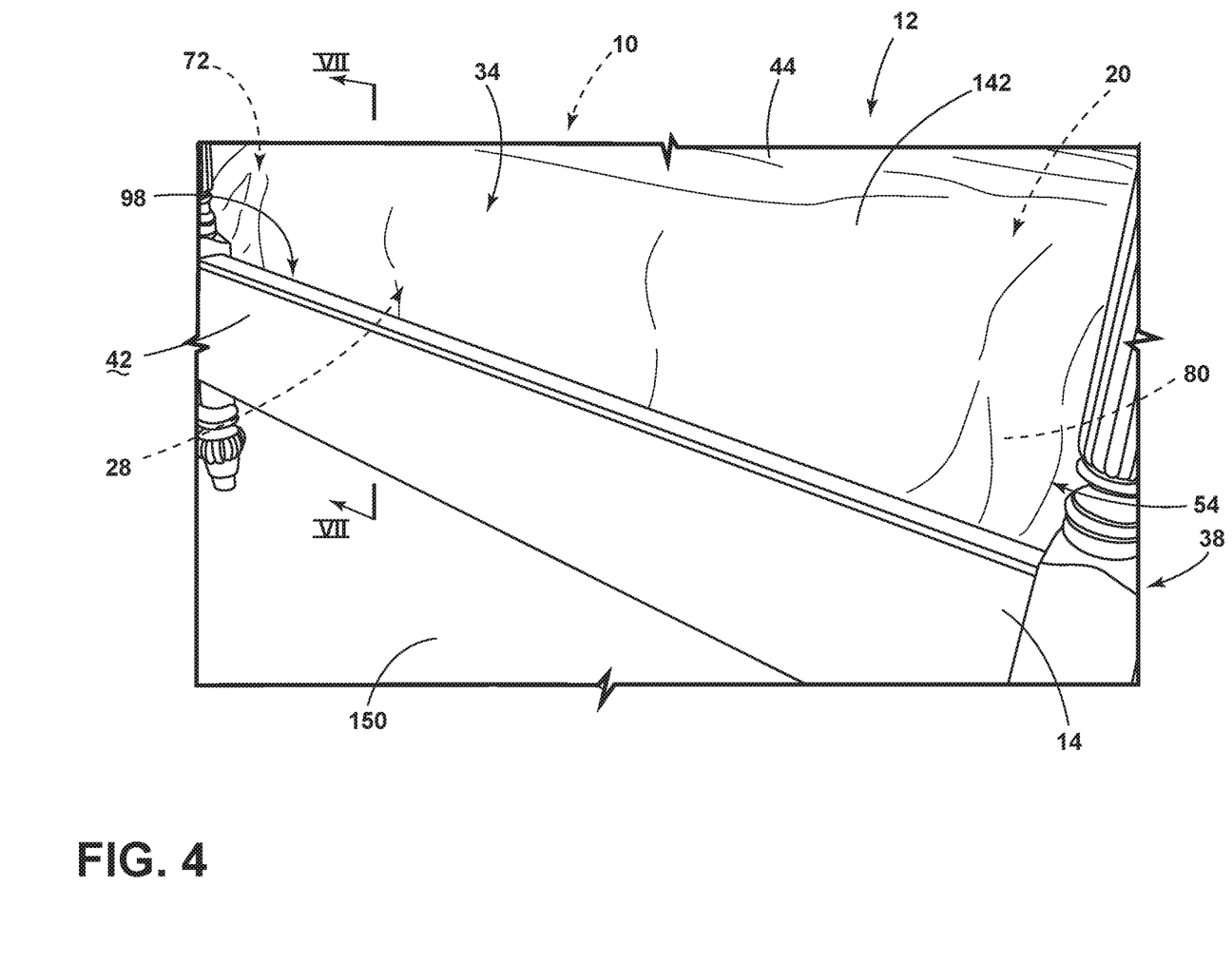
FIG. 4 is a perspective view of the storage device of FIG. 3 shown concealed behind a bed covering.
Figure 5:
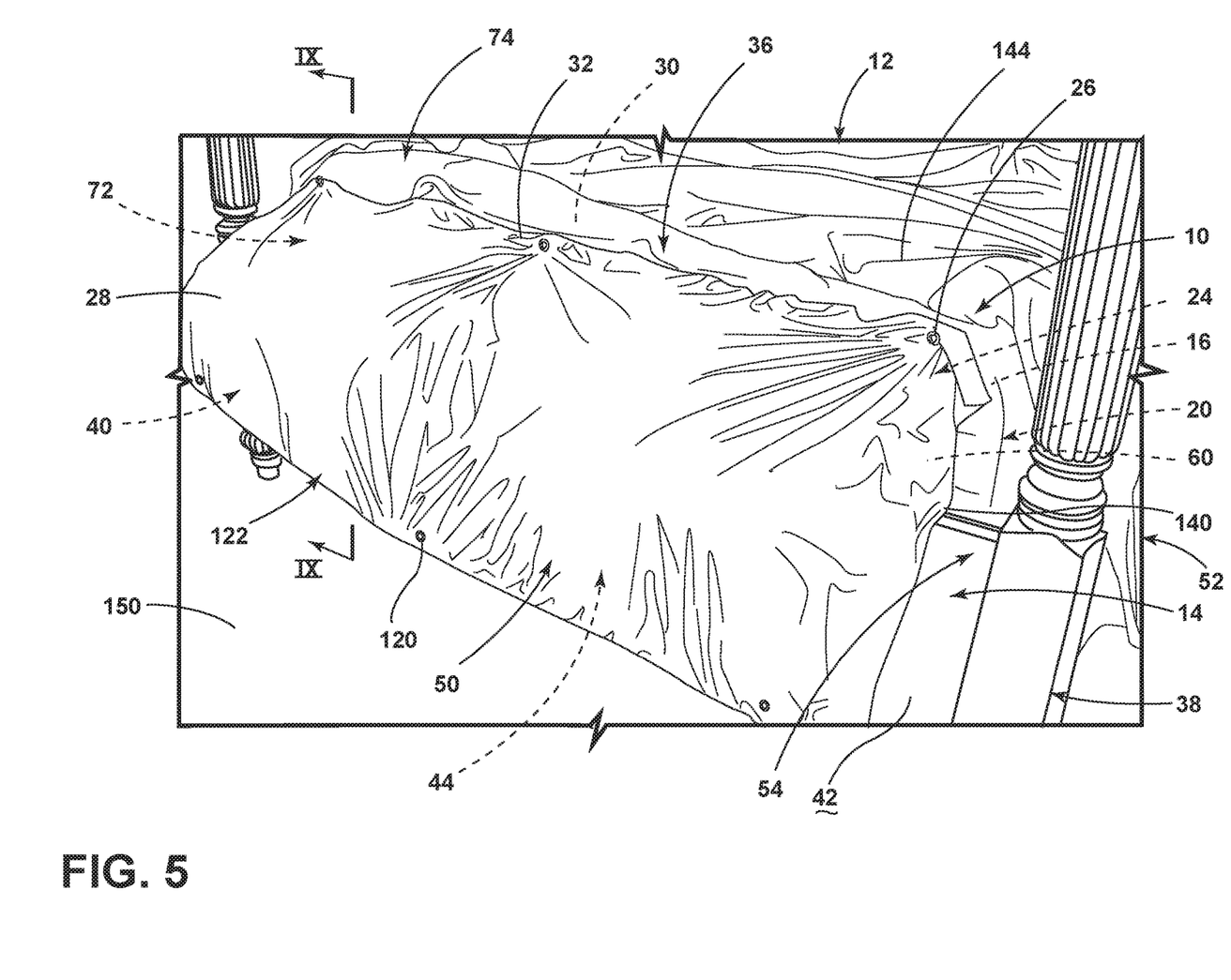
FIG. 5 is a perspective view of the storage device shown in the use position with linens and bed coverings stored therein.
Figure 6:
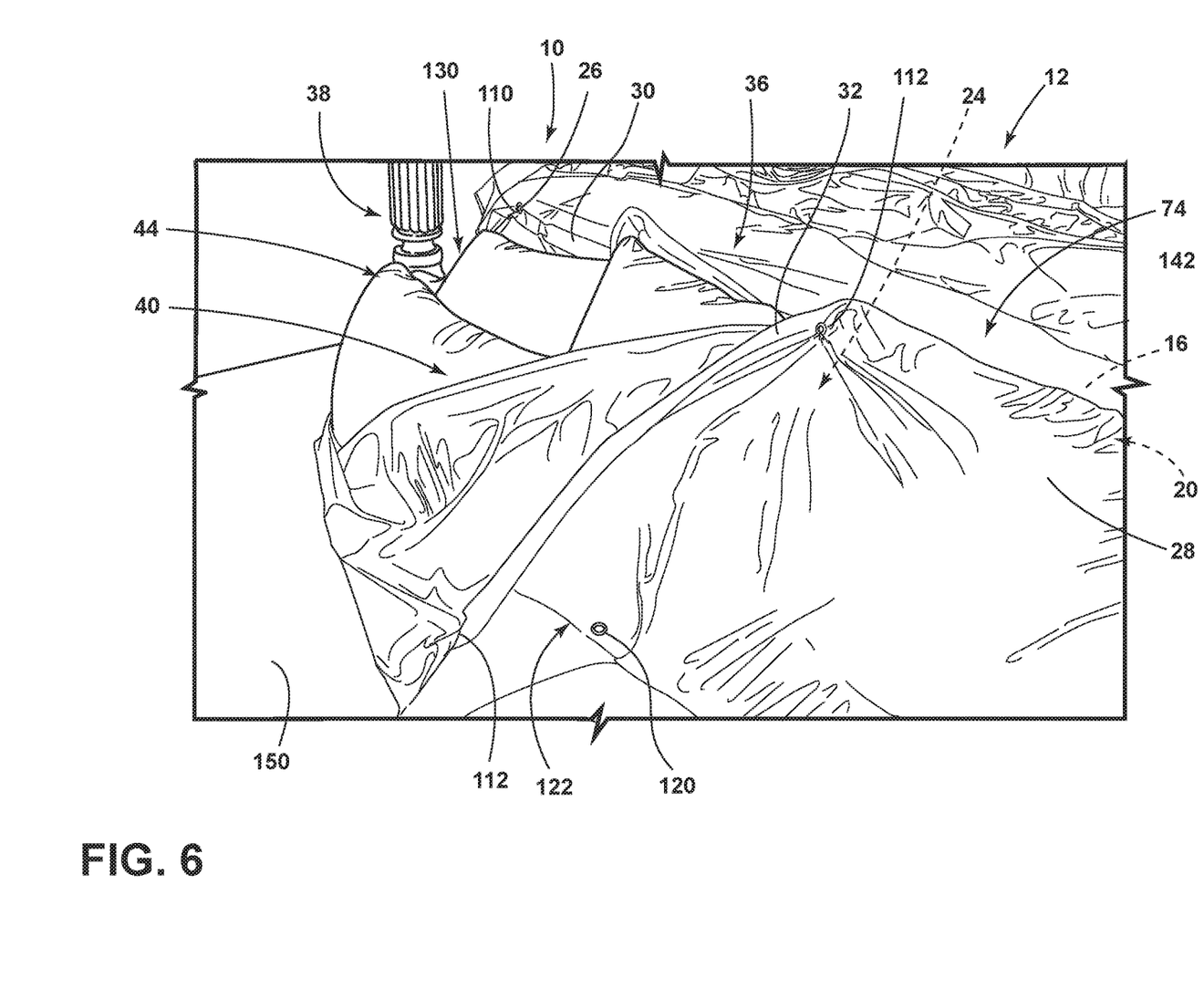
FIG. 6 is a perspective view of the storage device of FIG. 5 showing the flexible storage member disengaged from one of the securing members to provide an access space into the interior storage space of the storage device.
Figure 7:
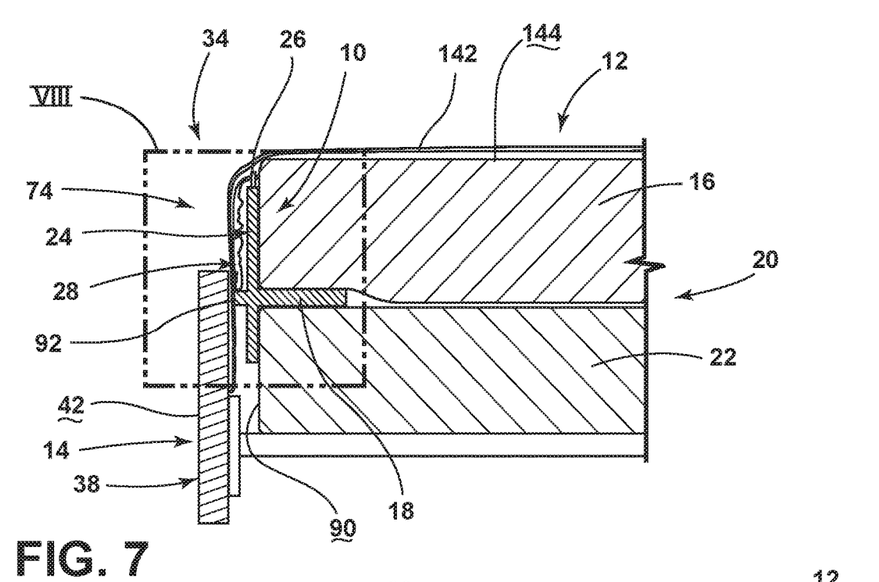
FIG. 7 is a cross-sectional view of the storage device of FIG. 4 taken along line VII-VII.
Figure 8:
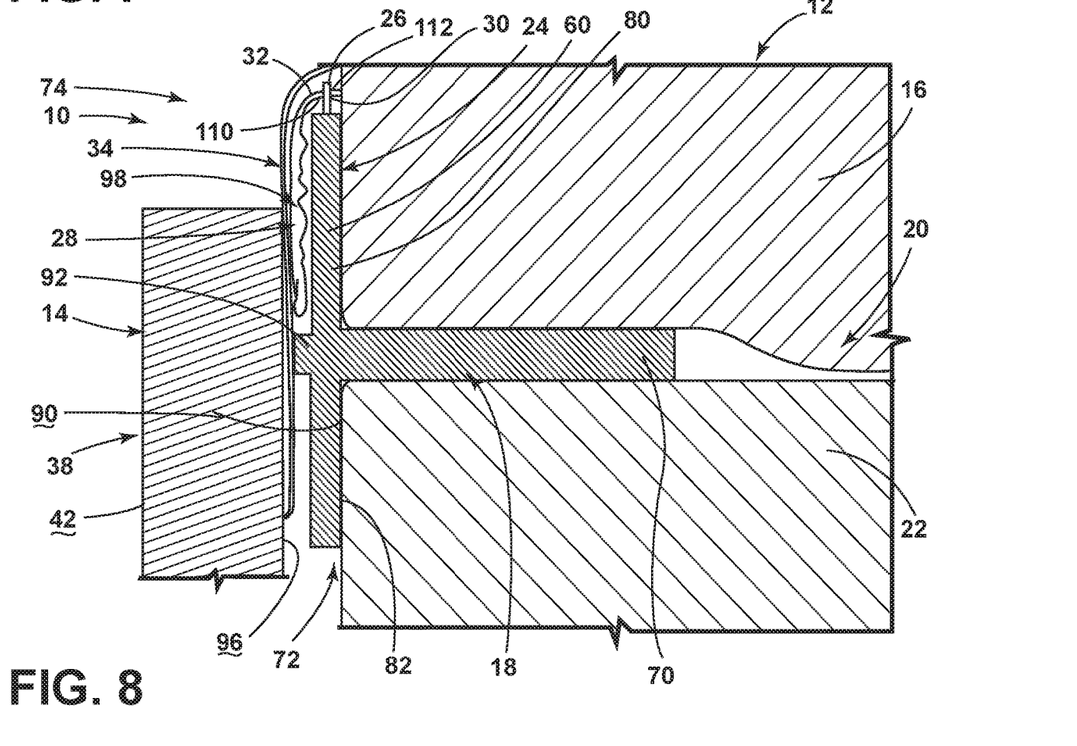
FIG. 8 is an enlarged cross-sectional view of the storage device of FIG. 7 taken at area VIII.
Figure 9:
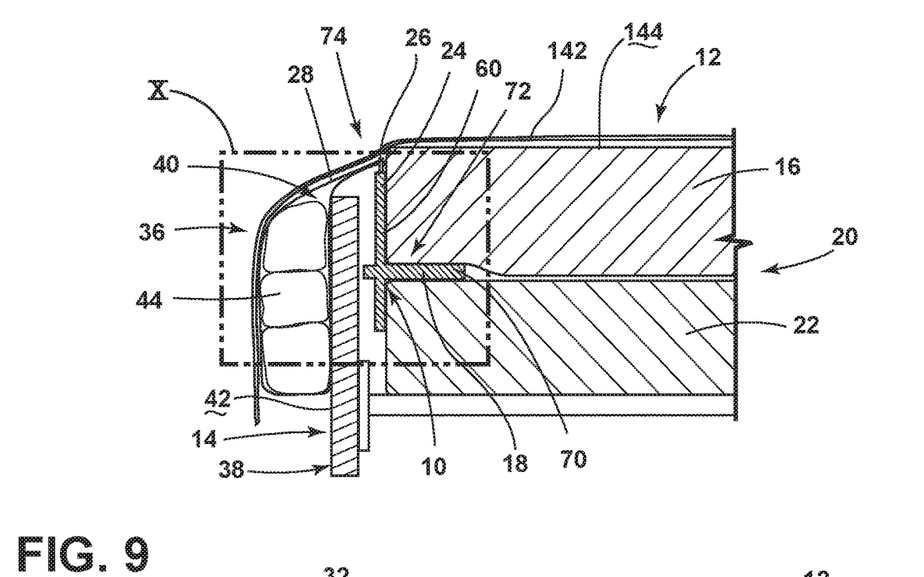
FIG. 9 is a cross-sectional view of the storage device of FIG. 5 taken along line IX-IX and showing a bed covering concealing the storage device in the use position.
Figure 10:
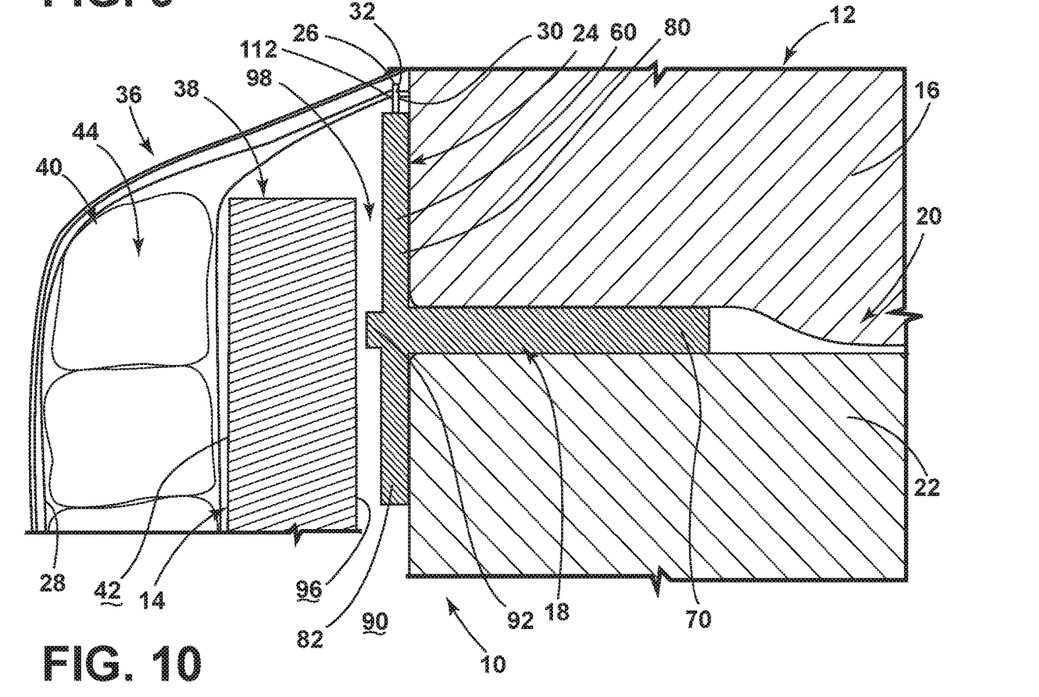
FIG. 10 is an enlarged cross-sectional view of the storage device of FIG. 9, taken at area X.

Referring now to FIG. 2, each support fixture 72 can be made of separate members that can be coupled with one another to form the vertical stanchion 60 and the horizontal base 70. It also contemplated that the vertical stanchion 60 and horizontal base 70 can be made from a single integral member. In either instance, the vertical stanchion 60 includes an upper portion 80 that extends from the horizontal base 70 and a lower portion 82 that extends below the horizontal base 70. The upper portion 80, in certain aspects of the device, may be flush with, or may extend laterally from, the horizontal base 70.

As exemplified in FIGS. 7-10, the lower portion 82 of the vertical stanchion 60 engages the edge surface 90 of the mattress support 22. At the same time, the horizontal base 70 extends between the mattress 16 and the mattress support 22. Through this configuration, the weight of the mattress 16 holds the horizontal base 70 in a generally horizontal position. Additionally, the lower portion 82 of the vertical stanchion 60 engages the edge surface 90 of the mattress support 22. Each of the horizontal base 70 and the lower portion 82 of the vertical stanchion 60 resists rotation of the support fixture 72 away from the mattress members 20.

Where the bed 12 includes a footboard 14, the horizontal base 70 can include an offset portion 92 that extends rearward of the vertical stanchion 60. This offset portion 92 can be adapted to provide a predetermined spacing between the bed-side surface 96 of the footboard 14 and the vertical stanchion 60 of the support fixture 72. In this manner, the offset portion 92 can define a tuck space 98. The flexible storage member 28 can be placed within this tuck space 98 to define the stowed position 34.

Referring again to FIGS. 7-10, the horizontal base 70 and the lower portion 82 of the vertical stanchion 60 define the primary support for maintaining the support fixture 72 positioned between the mattress 16 and the mattress support 22. As discussed above, this engagement between the horizontal base 70 with the mattress 16 and mattress support 22 and the engagement of the lower portion 82 of the vertical stanchion 60 with the mattress support 22 prevents rotation of the support fixture 72 away from the mattress member 20. By providing this support, the upper portion 80 of the vertical stanchion 60 can maintain the flexible storage member 28 in the use position 36. As discussed above, the upper portion 80 of the vertical stanchion 60 can be even with the horizontal base 70 or can extend above the horizontal base 70. A taller upper portion 80 can result in a larger interior storage space 40 that is defined by the flexible storage member 28 as the upper portion 80 is positioned farther from the floor 150.

Referring now to FIGS. 5, 6 and 9-10, the flexible storage member 28 and the interior storage space 40 contained therein is used for containing and supporting various bed accessories 44. These bed accessories 44 can have a significant volume and can require a large amount of space for storage. The flexible storage member 28, which is typically a fabric member, can be extended in the use position 36 to form a significant interior storage space 40 that can be used for containing these bed accessories 44, such as linens, functional pillows, decorative pillows, bed coverings as described herein, stuffed animals, plush toys, blankets, throws, bed-related accent pieces, and other similar functional and decorative pieces, as described herein.

Referring again to FIGS. 1-10, the flexible storage member 28 typically includes securing fasteners 110 that are positioned at the first edge 30 and operable fasteners 112 at the second edge 32. As noted above, the securing fasteners 110 at the first edge 30 are configured to be fixedly secured to the plurality of securing members 26. Accordingly, the first edge 30 of the flexible storage member 28 is configured to remain attached to the vertical stanchion 60 and is not typically subject to removal. The first edge 30 may be removed if the securing members 26 are removed from the vertical stanchions 60 or otherwise manipulated to allow for removal of the securing fasteners 110. It is contemplated that the first edge 30 can be removed from the vertical stanchions 60 for cleaning, repair and/or replacement of the flexible storage member 28. The second edge 32 of the flexible storage member 28 can include operable fasteners 112 that may be selectively attached to the plurality of securing members 26. These operable fasteners 112 can be engaged with pins, hooks, clasps, hasps, hook and loop, and other similar attaching features that can form the structure for the securing members 26. Typically, the securing members 26 are positioned at a top edge 114 of each vertical stanchion 60. It is also contemplated that the securing members 26 can extend from a front face 116 or an edge of a vertical stanchion 60. Various connecting mechanisms can be used for selectively attaching the first and second edges 30, 32 of the flexible storage member 28 to the plurality of securing members 26.

The use of the securing fasteners 110 located at the first edge 30 of the flexible storage member 28 and the operable fasteners 112 at the second edge 32 of the flexible storage member 28 cooperate to define an accessible interior storage space 40 of the storage device 10. Additionally, the securing and operable fasteners 110, 112 provide a support point for attaching to the various securing members 26 of the support fixtures 72.

According to various aspects of the device, while securing and operable fasteners 110, 112, respectively, are shown on the first and second edges 30, 32 of the flexible storage member 28 as being grommet-type structures, it should be understood that other fastening configurations can be used. By way of example and not limitation, the securing and operable fasteners 110, 112 can be in the form of hooks that extend from one or both of the first and second edges 30, 32, fabric loops, zippers, hook-and-loop connectors, buttons, snaps, and other similar fastening mechanisms that can be used to operably connect the flexible storage member 28 to the securing members 26 of the support fixtures 72. It should also be understood that the securing and operable fasteners 110, 112 can all be the same type of attachment mechanism. It is also contemplated that the structure of the securing fasteners 110 can be different from that of the operable fasteners 112.

Figure 11:
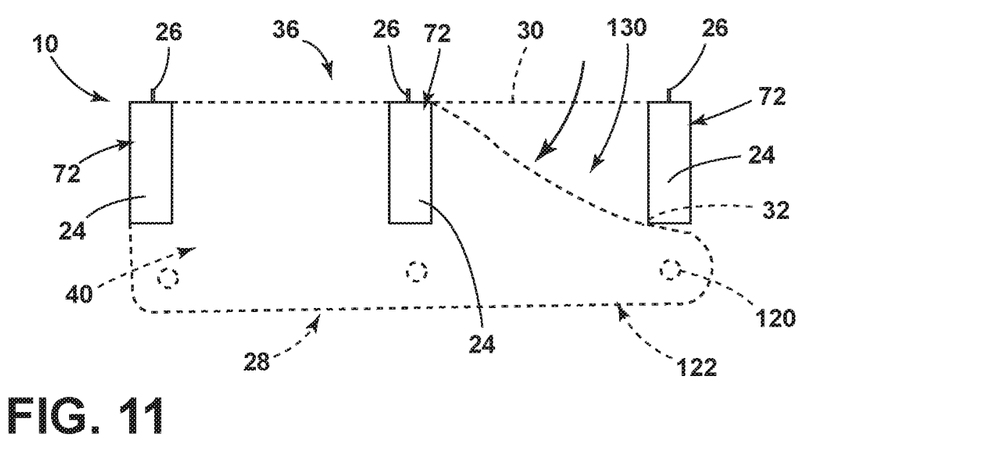
FIG. 11 is a schematic elevational view of an aspect of the storage device showing an access space at a first side of the storage device.
Figure 12:
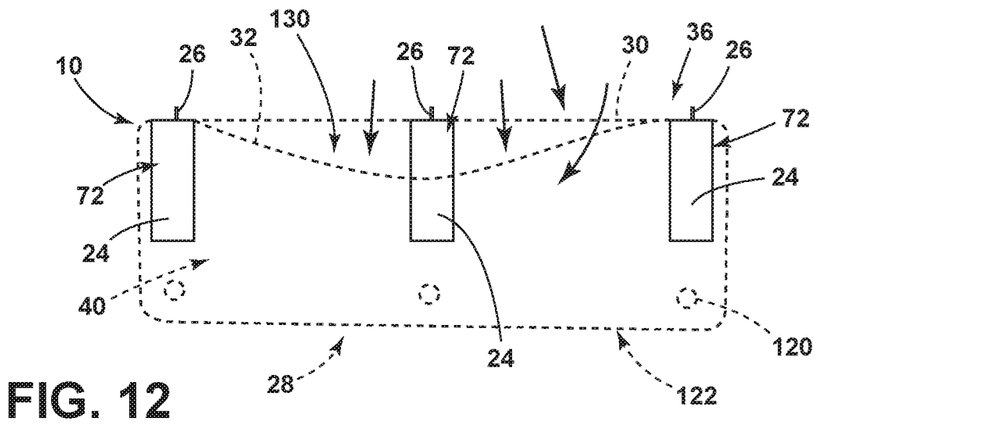
FIG. 12 is a schematic diagram illustrating the storage device and illustrating an access space within the center of the storage device.
Figure 13:
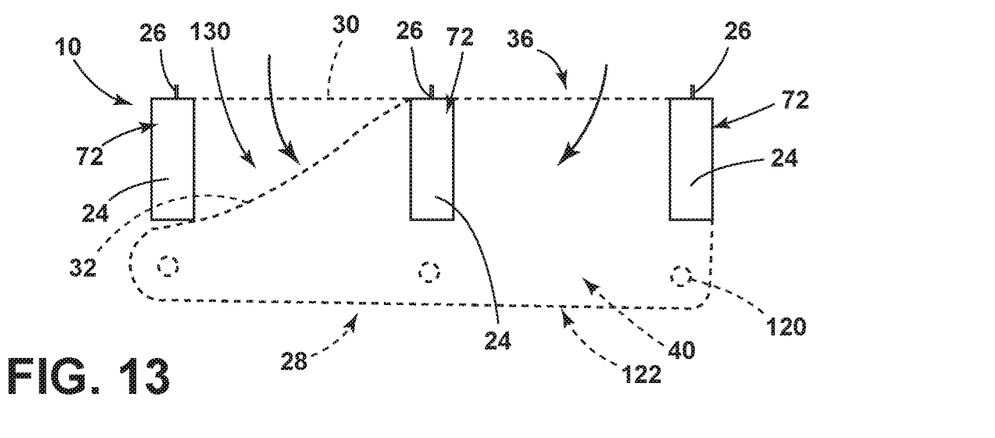
FIG. 13 is a schematic diagram illustrating an access space at a second side of the storage device.
Figure 14:
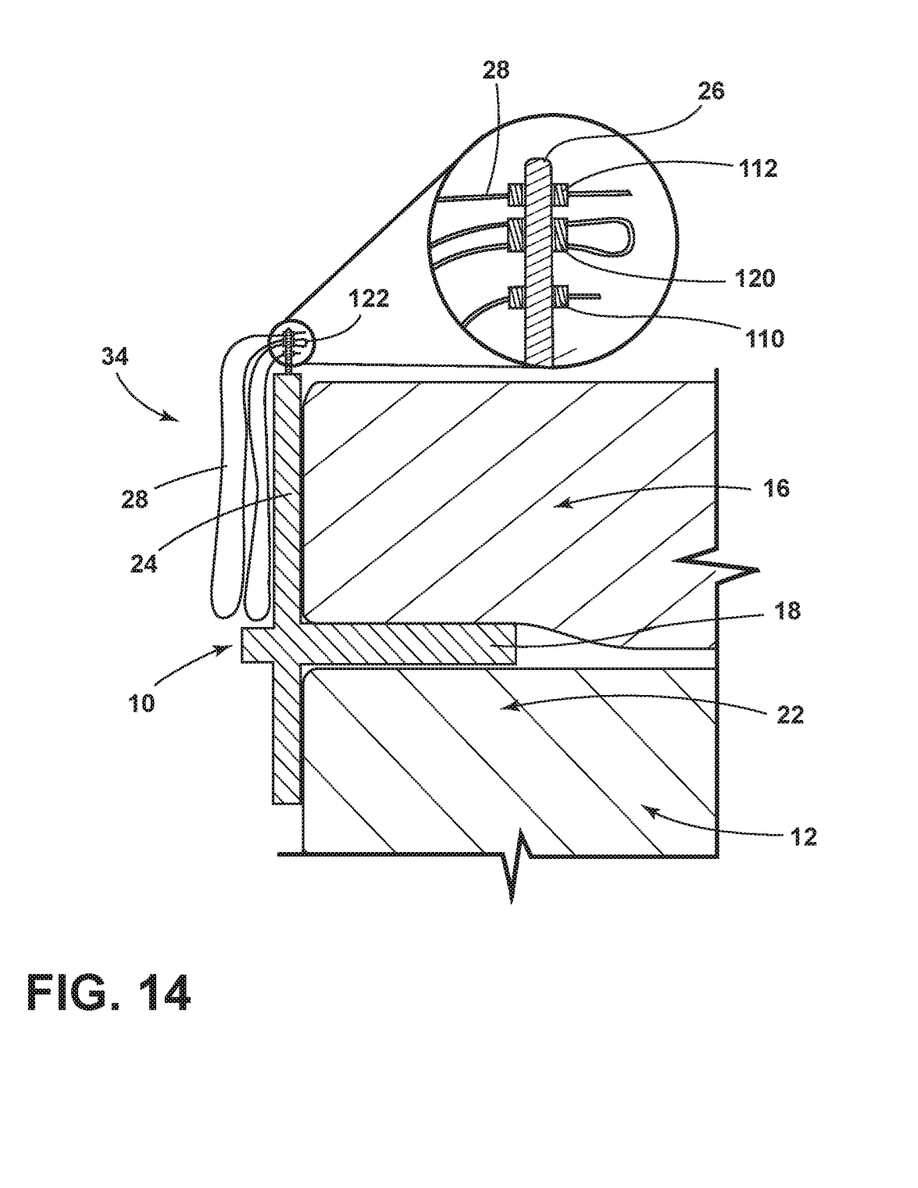
FIG. 14 is a schematic cross-sectional view of an aspect of the storage device in the stowed position.

Referring now to FIGS. 11-13, the storage device 10 can include a plurality of support fixtures 72. While three support fixtures 72 are exemplified in the figures, more or fewer support fixtures 72 can be used based upon the desired configuration, the size of the bed 12, the amount of bed accessories 44 to be stored, and other factors and considerations. These support fixtures 72 can define a plurality of access spaces 130 for inserting or removing bed accessories 44 from the interior storage space 40. In use of the storage device 10, the second edge 32 of the flexible storage member 28 can be separated from the securing members 26 at a support fixture 72 on one side of the bed 12 (shown in FIG. 11), and can define an access space 130 for inserting or removing bed accessories 44 from one side of the interior storage space 40. Similarly, removal of the second edge 32 of the flexible storage member 28 from a storage fixture at the opposing side of the bed 12 (shown in FIG. 13) provides an access space 130 for providing access to the opposite side of the interior storage space 40. Also, removal of the second edge 32 of the flexible storage member 28 from the support fixture 72 located in the middle of the bed 12 (shown in FIG. 12) can provide a single, centrally located access space 130 for inserting or removing bed accessories 44 from the interior storage space 40. The number of access spaces 130 for accessing the interior storage space 40 can depend upon the number of support fixtures 72 that are attached to the bed 12 for forming the storage device 10.

The support fixtures 72 can be made of various materials. These materials can include, but are not limited to, plastic, metal, wood, composite materials, combinations thereof, and other similar materials. In various aspects of the device, the vertical stanchion 60 may be made of one material and the horizontal base 70 may be made of a different material. In other aspects of the device, the vertical stanchion 60 and horizontal base 70 may be made of the same material and also may be made of a single integral member. In one exemplary and non-limiting aspect, where the support fixture 72 is made of plastic, the vertical stanchion 60 and horizontal base 70 can be made of a single injection molded member. It is also contemplated that the securing member 26 for the support fixture 72 can be a separate member that is attached to the vertical stanchion 60, or may be an integrally formed aspect of the vertical stanchion 60.

Referring again to FIGS. 1-13, in use, the storage device 10 can be coupled with the mattress members 20 of a bed 12 for providing the interior storage space 40 for holding various bed accessories 44. During installation, each support fixture 72 can be inserted between the mattress 16 and the mattress support 22, such that the horizontal base 70 extends between these two mattress members 20. The horizontal base 70 is inserted such that the lower portion 82 of the vertical stanchion 60 abuts or is in close proximity to the edge surface 90 of the mattress support 22. In the stowed position 34, the flexible storage member 28 can be concealed from view, such as under a bed covering member 142 or between the vertical stanchion 60 and the mattress 16.

Where the bed 12 includes a footboard 14, the support fixture 72 may include the offset portion 92. This offset portion 92 can provide a space between the bed-side surface 96 of the footboard 14 and the front face 116 of the vertical stanchion 60. When the support fixtures 72 are installed between the mattress members 20, the flexible storage member 28 can be inserted into the tuck space 98 between the footboard 14 and the vertical stanchion 60 to define the stowed position 34.

In the various embodiments of the storage device 10, when needed, the flexible storage member 28 can be pulled out from the stowed position 34. At least one of the operable fasteners 112 can be disengaged or otherwise separated from the securing members 26 to form the access space 130. This access space 130 can be used for inserting the bed accessories 44. Once the bed accessories 44 are included within the interior storage space 40, the operable fasteners 112 can be reattached to the securing member 26 so that the interior storage space 40 is substantially enclosed.

Referring now to FIGS. 5 and 11-14, the flexible storage member 28 can be placed in the stowed position 34 using storage fasteners 120 that are located within a medial area 122 of the flexible storage member 28. The storage fasteners 120 can be used for attaching to the securing members 26. This attachment of the storage fasteners 120 effectively folds the flexible storage member 28 in half to define the stowed position 34. Typically, the number of storage fasteners 120 will match the number of securing and operable fasteners 110, 112. The structure of the storage fasteners 120 can also be similar to those structures described for use as the securing and operable fasteners 110, 112. In addition to defining the stowed position 34, the storage fasteners 120, as well as the securing and operable fasteners 110, 112, can be used for hanging purposes when the flexible storage member 28 needs to be dried or aired out. Where the storage fasteners 120 are in the form of grommets, it is contemplated that these grommets located in the medial area 122 of the flexible storage member 28 can allow for a minimal amount of airflow into and out from the interior storage space 40 when the flexible storage member 28 is in the use position 36.

According to various aspects of the device, the outer edges 140 of the flexible storage member 28 may be opened. It is also contemplated that the flexible storage member 28 can include one or more pleats or enclosed areas that may form enclosed sides at the outer edges 140 of the flexible storage member 28 in the use position 36. After the bed accessories 44 are included within the interior storage space 40, a separate bed covering member 142 may be positioned over the flexible storage member 28 for concealing the storage device 10 from direct view. Depending upon the amount of bed accessories 44 included within the flexible storage member 28, the presence of the flexible storage member 28 may be apparent, but direct a visual perception of the storage device 10 can be prevented. Typically, the securing members 26 that are positioned on the vertical stanchion 60 are positioned below a top surface 144 of the mattress 16. This is to ensure that occupants of the bed 12 and the mattress 16 do not kick or otherwise engage the support fixtures 72 while sleeping or otherwise occupying the bed 12.

In certain conditions, the frame members 38 of the bed 12 can include the footboard 14 and a headboard. In such a condition, the footboard 14 and headboard conceal the mattress support 22 from view. Additionally, the footboard 14 and headboard can partially conceal the mattress 16 from view. Accordingly, use of the support fixture 72 having the horizontal base 70 and vertical stanchion 60 can provide the interior storage space 40, even in situations where space is limited by the presence of a footboard 14 of the bed 12. As discussed herein, the storage device 10 can be utilized in connection with beds 12 that do not include a footboard 14.

The use of the storage device 10 that includes the support fixtures 72 is useful in residential, health care and hospitality settings. In particular, the storage device 10 can be utilized in residential bedrooms for storing bed accessories 44. As discussed herein, such bed accessories 44 may include, but are not limited to, linens, functional pillows, decorative pillows, bed coverings as described herein, stuffed animals, plush toys, blankets, throws, bed-related accent pieces, and other similar bedroom-type items.

Also, within a hotel room or other commercially-provided accommodation, changing of linens can be made more efficient through the use of the storage device 10 having the interior storage space 40 provided by the flexible storage member 28. Where linens are to be changed, a bed accessory 44 such as a bedspread can be easily moved from above the mattress 16 and into the interior storage space 40 provided by the flexible storage member 28 and the support fixture 72. Additionally, bed accessories 44, such as pillows, can be inserted within the interior storage space 40 as well. Through the use of the storage device 10, bedspreads, pillows, and other bed accessories 44 need not be placed upon the floor 150, but can be included within the interior storage space 40 in an orderly fashion for efficient insertion into and removal from the interior storage space 40.

In various aspects of the device, after the bed accessories 44 have been located within the interior storage space 40 provided by the flexible storage member 28, linens can be removed and replaced. Because the horizontal base 70 of the vertical storage device 10 is positioned beneath the mattress 16, sheets and other linens are able to be placed over the mattress 16 while the storage device 10 is inserted between the mattress 16 and the mattress support 22. Accordingly, a full change of linens can be accomplished, through the use of the storage device 10 having the flexible storage member 28, without placing any of the pillows and bed coverings onto the floor 150. This functionality can provide a more efficient method for changing linens and also provide better sanitation by preventing placement of bed items onto the floor 150 of the various accommodations.

The storage device 10 that includes the support fixture 72 and the flexible storage member 28 can be used within various bed types. Such bed types can include, but are not limited to, different bed sizes, loft-type beds, bunk beds daybeds, children's beds, beds within trailers and recreational vehicles and other vehicles, and other similar bed types.

Use of the storage device 10 can also be utilized for storing bed accessories 44, while also providing a clear space around the bed 12 for navigating purposes, such as in low-light conditions. In using the storage device 10, bed accessories 44 that may typically be used or displayed during the day can be conveniently stored out of the way to avoid tripping on these items at night.

According to various aspects of the device, the flexible storage member 28 can be a fabric member. The fabric that forms the flexible storage member 28 can be any one of various fabrics that can include, but are not limited to, canvas, cotton, vinyl, leather, polyester, elastic-type fabrics, and other similar fabric-type materials. Where the flexible storage member 28 is made of an elastic-type fabric, the size of the interior storage space 40 can expand and contract based upon the number and size of items that are disposed within the interior storage space 40.

To provide greater stability at the horizontal base 70 for supporting the position of the support fixture 72 between the mattress 16 and the mattress support 22, the horizontal base 70 may have a width that is greater than the vertical stanchion 60. Through this configuration, the horizontal base 70 has a greater surface area for receiving the weight of the mattress 16. This increased surface area provides a greater downforce for maintaining the horizontal base 70 in position between the mattress 16 and the mattress support 22. Additional downforce typically results in a greater ability to prevent rotation of the support fixture 72 away from the mattress members 20 when in the use position 36.

As discussed above, the support fixture 72 may include a single horizontal support member 18 that extends across the entire storage device 10. In such an embodiment, the single horizontal support member 18 can have a plurality of vertical stanchions 60 that extend therefrom. In this embodiment, the vertical stanchions 60 include a number of upper portions 80 that extend upward from the horizontal support member 18. The lower portion 82 of the vertical stanchions 60 may be a plurality of individual members or may be a single elongated member that extends the length or substantially the length of the horizontal support member 18. The design of the horizontal support member 18 and vertical support members 24 can vary depending upon the configuration of the bed 12, a particular setting, the number of items to be placed within the interior storage area, and other similar considerations. As discussed above, the upper portions 80 of the vertical stanchions 60 can be even or flush with the horizontal support member 18. In such a condition, the support fixture 72 may have a generally "L" shape wherein the horizontal support member 18 engages the vertical stanchion 60 at an end, or proximate an end, thereof.

The use of the storage device 10 having the support fixture 72 and the flexible storage member 28 is used to make storage and use of bed coverings and other decorative fixtures more efficient, while also providing a convenient storage space for placing these items while linens are changed on the bed 12. Additionally, the flexible storage member 28 provides an interior storage space 40 that is elevated above the floor 150 so that these items do not need to be placed on the floor 150 while not in use or while changing linens.

While the storage device 10 is described above as holding bed accessories 44, it is contemplated that the storage device 10 can also be used to temporarily contain or store other items. Such other items can include, but are not limited to, laundry, blankets, plush toys, baby items and other similar household items. It is also contemplated that the various aspects of the storage device 10 are removable from the bed 12 for cleaning, repair and replacement. The individual components of the storage device 10 are also contemplated to be separable from one another and also capable of reassembly for cleaning, repair and replacement of the component parts.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A storage device for installation on a bed, the storage device comprising:
    a horizontal support member configured to be inserted between two mattress members;
    a vertical support member coupled with and supported by the horizontal support member;
    a plurality of securing members coupled to the vertical support member; and
    a flexible storage member that is fixedly secured to the plurality of securing members at a first edge and selectively attached to the plurality of securing members at a second edge, wherein:
        the flexible storage member is operable between a stowed position and a use position;
        the stowed position defined by the flexible storage member being at least partially concealed from view; and
        the use position defined by the flexible storage member forming an interior storage space that is contained within the flexible storage member and supported by the plurality of securing members.

2. The storage device of claim 1, wherein the vertical support member includes a plurality of vertical stanchions that are coupled with the horizontal support member, wherein each vertical stanchion includes a respective securing member of the plurality of securing members.

3. The storage device of claim 2, wherein the horizontal support member includes a plurality of horizontal bases, wherein each horizontal base is coupled to a respective vertical stanchion.

4. The storage device of claim 3, wherein the vertical stanchion and the horizontal base are formed of a single integral member.

5. The storage device of claim 2, wherein the vertical stanchion includes a lower portion and an upper portion, wherein the lower portion is configured to engage an edge of a mattress support of the mattress members, and wherein the upper portion supports at least one securing member of the plurality of securing members.

6. The storage device of claim 5, wherein the upper portion extends above the horizontal support member.

7. The storage device of claim 1, wherein the mattress members include a mattress that is supported from below by a mattress support.

8. The storage device of claim 7, wherein the mattress support is a box spring.

9. A storage device for installation on a bed, the storage device comprising:
    a horizontal support member that is supported between a mattress and a mattress support;
    a vertical stanchion attached to the horizontal support member and that is laterally supported against the mattress support;
    a securing member coupled to the vertical stanchion; and a flexible storage member that is fixedly secured to the securing member at a first edge of the flexible storage member and selectively attached to the securing member at a second edge of the flexible storage member, wherein:
the flexible storage member is operable between a stowed position that is collapsed against the flexible storage member and a use position defined by the flexible storage member forming an interior storage space that is contained within the flexible storage member and supported by the securing member.

10. The storage device of claim 9, wherein the vertical stanchion is coupled with the horizontal support member, wherein the vertical stanchion includes the securing member.

11. The storage device of claim 10, wherein the horizontal support member includes a horizontal base that engages the vertical stanchion.

12. The storage device of claim 9, wherein the vertical stanchion includes a lower portion and an upper portion, wherein the lower portion is configured to engage an edge of the mattress support of the horizontal support members, and wherein the upper portion supports the securing member.

13. The storage device of claim 12, wherein the upper portion extends above the horizontal support member.

14. The storage device of claim 9, wherein the horizontal support members include a mattress that is supported from below by a mattress support.

15. The storage device of claim 14, wherein the mattress support is a box spring.

16. The storage device of claim 9, wherein the flexible storage member defines an access space into the interior storage space when a portion of the second edge is separated from the securing member.

17. A storage device for installation on a bed, the storage device comprising:
a horizontal support member that is supported between two mattress members;
a vertical support member coupled with and supported by the horizontal support member;
a plurality of securing members coupled to the vertical support member; and
a flexible storage member that is fixedly secured to the plurality of securing members at a first edge and selectively attached to the plurality of securing members at a second edge, wherein:
the flexible storage member is operable between a stowed position and a use position;
the stowed position defined by the flexible storage member being at least partially concealed from view;
the use position defined by the flexible storage member forming an interior storage space that is contained within the flexible storage member and supported by the plurality of securing members; and
the flexible storage member defines an access space into the interior storage space when a portion of the second edge is separated from the plurality of securing members.

18. The storage device of claim 17, wherein the vertical support member includes a plurality of vertical stanchions that are coupled with the horizontal support member, wherein each vertical stanchion includes a respective securing member of the plurality of securing members, and wherein the horizontal support member includes a plurality of horizontal bases, wherein each horizontal base is coupled to a respective vertical stanchion.

19. The storage device of claim 18, wherein each vertical stanchion includes a lower portion and an upper portion, wherein the lower portion is configured to engage an edge of a mattress support of the mattress members, and wherein the upper portion supports at least one securing member of the plurality of securing members.

20. The storage device of claim 19, wherein the upper portion extends above the horizontal support member.

* * * * *